(12) United States Patent
Kakuda et al.

(10) Patent No.: US 9,905,365 B2
(45) Date of Patent: Feb. 27, 2018

(54) COMPOSITE ELECTRONIC DEVICE

(71) Applicant: TDK CORPORATION, Tokyo (JP)

(72) Inventors: Kouichi Kakuda, Tokyo (JP); Takashi Suzuki, Tokyo (JP); Masaki Takahashi, Tokyo (JP); Yukio Takahashi, Tokyo (JP); Shinichi Kondo, Tokyo (JP); Asuka Murai, Tokyo (JP); Akihiko Oide, Tokyo (JP); Naoki Uchida, Tokyo (JP); Hidekazu Sato, Tokyo (JP)

(73) Assignee: TDK CORPORATION, Tokyo (JP)

( * ) Notice: Subject to any disclaimer, the term of this patent is extended or adjusted under 35 U.S.C. 154(b) by 0 days.

(21) Appl. No.: 15/215,237

(22) Filed: Jul. 20, 2016

(65) Prior Publication Data

US 2017/0025226 A1    Jan. 26, 2017

(30) Foreign Application Priority Data

Jul. 21, 2015    (JP) ................................ 2015-144334

(51) Int. Cl.
*H01G 4/40*    (2006.01)
*H01F 1/03*    (2006.01)
(Continued)

(52) U.S. Cl.
CPC ............... *H01G 4/40* (2013.01); *B32B 18/00* (2013.01); *C04B 35/265* (2013.01);
(Continued)

(58) Field of Classification Search
CPC ............ H01G 4/30; H01G 4/012; H01G 4/12; H01G 4/246; H01G 4/1227; H01G 4/005; H01G 4/10; H01G 4/40
See application file for complete search history.

(56) References Cited

U.S. PATENT DOCUMENTS

| 5,723,395 A | 3/1998 | Suzuki et al. |
| 6,080,468 A | 6/2000 | Yamaguchi |

(Continued)

FOREIGN PATENT DOCUMENTS

| EP | 0779257 B1 | 2/2001 |
| JP | S59-90915 A | 5/1984 |
| JP | H03-97211 A | 4/1991 |
| JP | H04-284611 A | 10/1992 |
| JP | H06-77022 A | 3/1994 |
| JP | H06-176967 A | 6/1994 |
| JP | H06-251995 A | 9/1994 |

(Continued)

*Primary Examiner* — Nguyen Ha
(74) *Attorney, Agent, or Firm* — Oliff PLC

(57) ABSTRACT

Composite electronic including coil, capacitor and intermediate parts, wherein coil part includes coil-conductor and magnetic-layer, capacitor part includes internal electrodes and dielectric-layer, which contains SrO—TiO2 or ZnO—TiO2 based oxide, intermediate part between coil and capacitor parts, intermediate part includes intermediate material layer, which contains ZnO, TiO2 and boron, ZnO contained in intermediate material layer 50-85 parts by mole and TiO2 contained the intermediate material layer 15-50 parts by mole when total content of ZnO and TiO2 in intermediate material layer is 100 parts by mole, content boron in intermediate material layer is 0.1-5.0 parts by weight of B2O3 when total of ZnO and TiO2 in intermediate material layer set to 100 parts by weight, part of ZnO and TiO2 intermediate material layer constitute ZnO—TiO2 compound, which in intermediate material layer is 50 wt % or more when total weight of ZnO and TiO2 in intermediate material layer is set to 100 wt %.

10 Claims, 8 Drawing Sheets

(51) Int. Cl.

| | | |
|---|---|---|
| *C04B 35/47* | (2006.01) | |
| *C04B 35/462* | (2006.01) | |
| *C04B 35/453* | (2006.01) | |
| *B32B 18/00* | (2006.01) | |
| *C04B 35/26* | (2006.01) | |
| *H01F 1/34* | (2006.01) | |
| *H01F 17/00* | (2006.01) | |
| *H01F 27/255* | (2006.01) | |

(52) U.S. Cl.
CPC .......... *C04B 35/453* (2013.01); *C04B 35/462* (2013.01); *C04B 35/47* (2013.01); *H01F 1/0306* (2013.01); *H01F 1/0315* (2013.01); *H01F 1/344* (2013.01); *H01F 17/0013* (2013.01); *H01F 27/255* (2013.01); *C04B 2235/3232* (2013.01); *C04B 2235/3236* (2013.01); *C04B 2235/3262* (2013.01); *C04B 2235/3279* (2013.01); *C04B 2235/3281* (2013.01); *C04B 2235/3284* (2013.01); *C04B 2235/3409* (2013.01); *C04B 2235/365* (2013.01); *C04B 2235/6025* (2013.01); *C04B 2237/34* (2013.01); *C04B 2237/346* (2013.01); *H01F 2017/0026* (2013.01)

(56) References Cited

U.S. PATENT DOCUMENTS

| | | |
|---|---|---|
| 6,094,111 A | 7/2000 | Sunahara |
| 2002/0064669 A1* | 5/2002 | Oobuchi ................... C03C 8/14 428/472 |
| 2009/0009267 A1 | 1/2009 | Miyata et al. |
| 2009/0097219 A1 | 4/2009 | Cho et al. |
| 2009/0278627 A1* | 11/2009 | Umemoto ........... H01F 17/0013 333/185 |
| 2010/0244987 A1 | 9/2010 | Sakurai et al. |
| 2011/0223431 A1 | 9/2011 | Sakurai et al. |

FOREIGN PATENT DOCUMENTS

| | | |
|---|---|---|
| JP | H08-31693 A | 2/1996 |
| JP | H10-149949 A | 6/1998 |
| JP | H11-243034 A | 9/1999 |
| JP | 2000-348972 A | 12/2000 |
| JP | 2001-244140 A | 9/2001 |
| JP | 2005-317748 A | 11/2005 |
| JP | 2009-099930 A | 5/2009 |
| JP | 2010-226038 A | 10/2010 |
| JP | 2011-211158 A | 10/2011 |
| WO | 2006/085624 A1 | 8/2006 |

* cited by examiner

COMPOSITE ELECTRONIC DEVICE

BACKGROUND OF THE INVENTION

1. Field of the Invention

The present invention relates to a composite electronic device, in particular, a composite electronic device such as a laminated filter obtained by integrally firing a coil part composed of a coil conductor and a magnetic layer and a capacitor part composed of internal electrodes and a dielectric layer.

2. Description of the Related Art

A resistance (R), a capacitor (C) and an inductor (L) are passive elements in an electronic circuit, and each of them has a unique function. Furthermore, the passive elements can have functions that are different from the unique functions by being connected mutually. Hereinafter, the functions that are different from the unique functions caused by the connection between the passive elements can be referred to as circuit functions.

The plural passive elements can show the circuit functions by being connected with each other via wires, etc. after having been separately mounted on a printed circuit substrate, etc. However, there is a disadvantage that the mounting area of the passive elements increases when the passive elements are mounted separately. Therefore, it is required that the circuit functions are obtained by a single electronic device to meet a demand for downsizing various application apparatuses. A laminated LC filter is given as an example where the circuit functions are obtained by a single electronic device.

The laminated LC filter is composite electronic device in which the coil part and the capacitor part exist independently in a single unit. Here, it is necessary that the coil part composed of a coil conductor and a magnetic layer and the capacitor part composed of internal electrodes and a dielectric layer are superposed on each other and fired simultaneously to be sintered integrally to obtain the laminated LC filter. However, there were cases where the coil part and the capacitor part can not be sintered sufficiently integrally due to a difference of material between the coil part and the capacitor part.

In recent years, there have been attempts to interpose an intermediate material layer between the coil part and the capacitor part when manufacturing the composite electronic device comprising the coil part and the capacitor part.

Patent Document 1 discloses a LC composite device characterized in that a ceramic material prepared to be totally 100 mol % by incorporating 0.5 to 30 mol % of CuO into $ZrO_2$, $TiO_2$ or mixture thereof is interposed between a dielectric ceramic part and a magnetic ceramic part as an intermediate layer.

Patent Document 2 discloses a LC composite device characterized in that a ceramic composed of 15 to 40 mol % of BaO and 60 to 85 mol % of $TiO_2$ and a glass contained in a dielectric ceramic part are disposed between the dielectric ceramic part and a magnetic ceramic part.

Patent Document 3 discloses a composite electronic device characterized in that an intermediate material layer includes FeZnCu based nonmagnetic ceramic and zinc borosilicate based glass.

Patent Document 4 discloses a bonding material for electronic device obtained by adding a $ZnO$—$SiO_2$—$B_2O_3$ based glass to a composition composed of ZnO, BaO and $TiO_2$.

Patent Document 5 discloses a composite electronic device characterized in that an intermediate material layer includes Zn—Ti material.

However, only the results in the specific dielectric ceramic materials are described in any of the Patent Documents 1 to 5. Therefore, it cannot be said that the techniques described in the Patent Documents 1 to 5 can be applied to any dielectric ceramics.

The dielectric ceramic part of the Patent Document 1 is composed of a Pb based composite perovskite material, and therefore is unfavorable from the viewpoint of environmental consideration. Further, in the Patent Document 1, a material which is sintered at 1000° C. at the time of integration is used. Therefore, Ag whose melting point is less than 1000° C. cannot used as a conductor material.

The dielectric ceramic part of the Patent Document 2 is composed of a material containing Pb, and therefore is unfavorable from the viewpoint of environmental consideration.

The intermediate material layer disclosed in the Patent Document 3 contains Fe. There are cases where characteristics of the dielectric ceramic part deteriorate due to a diffusion of Fe contained in the intermediate material layer at the time of sintering to the dielectric ceramic part depending on the material of the dielectric ceramic part.

The present inventors conducted a supplementary examination on the bonding material disclosed in the Patent Document 4. The inventors found that the material of the dielectric layer to which the bonding material disclosed in the Patent Document 4 can be actually applied is limited to a $CaO$—$TiO_2$ based oxide. Particularly, it was difficult to integrate the dielectric layer and the magnetic layer even if using the bonding material disclosed in the Patent Document 4 when the material of the dielectric layer is a $SrO$—$TiO_2$ based oxide or a $ZnO$—$TiO_2$ based oxide.

In the Patent Document 5, only a varistor composed mainly of ZnO is exemplified as the dielectric. In other words, it is unknown whether the technique described in the Patent Document 5 can be applied even when dielectrics other than the varistor composed mainly of ZnO are used. Further, in general, linear expansion coefficients are greatly deviated between ZnO and ferrite. Therefore, a crack is easily generated at the time of sintering when using the varistor composed mainly of ZnO as the dielectric and the ferrite as the magnetic components even if the intermediate material layer described in the Patent Document 5 is interposed. In addition, a demand for lowering height of a device cannot be satisfied when the thickness of the intermediate layer is thickened to reduce the influences caused by the great deviation of linear expansion coefficient.

The intermediate material layer used in the conventional arts described in the Patent Documents 1 to 5 have an effect of integrally firing the dielectric ceramic and the magnetic ceramic exemplified in each of the documents. However, appearances of a mutual diffusion between the dielectric ceramic and the intermediate material layer and a mutual diffusion between the intermediate material layer and the magnetic ceramic vary greatly depending on the materials of the dielectric ceramic and magnetic ceramic joined to the intermediate material layer. It is necessary to adjust the composition of the intermediate material layer by the dielectric ceramic and magnetic ceramic to control the mutual diffusions appropriately.

Patent Document 1: Japanese Patent Application Publication No. H7-120605
Patent Document 2: Japanese Patent No. 3368671
Patent Document 3: Japanese Patent No. 4020886
Patent Document 4: Japanese Patent No. 4257711
Patent Document 5: Japanese Patent No. 4759584

SUMMARY OF THE INVENTION

The purpose of this invention is to provide a composite electronic device in which a magnetic layer and a dielectric layer containing a SrO—TiO$_2$ based oxide or a ZnO—TiO$_2$ based oxide are integrated without any defect.

Means for Solving the Problem

The present invention is a composite electronic device comprising a coil part, a capacitor part and an intermediate part, wherein the coil part includes a coil conductor and a magnetic layer, the capacitor part includes internal electrodes and a dielectric layer, the dielectric layer contains a SrO—TiO$_2$ based oxide or a ZnO—TiO$_2$ based oxide, the intermediate part is located between the coil part and the capacitor part, the intermediate part includes an intermediate material layer, the intermediate material layer contains ZnO, TiO$_2$ and boron, a content of ZnO contained in the intermediate material layer is 50 to 85 parts by mole and a content of TiO$_2$ contained in the intermediate material layer is 15 to 50 parts by mole when a total of the content of ZnO and the content of TiO$_2$ contained in the intermediate material layer is set to 100 parts by mole, a content of boron contained in the intermediate material layer is 0.1 to 5.0 parts by weight in terms of B$_2$O$_3$ when a total of the content of ZnO and the content of TiO$_2$ contained in the intermediate material layer is set to 100 parts by weight, a part of ZnO and TiO$_2$ contained in the intermediate material layer constitute a ZnO—TiO$_2$ compound, and a content of the ZnO—TiO$_2$ compound contained in the intermediate material layer is 50 wt % or more when a total weight of ZnO and TiO$_2$ contained in the intermediate material layer is set to 100 wt %.

The composite electronic device in which the magnetic layer and the dielectric layer are integrated without any defect is provided by adopting the above constitution. In the present invention, a material of the magnetic layer is not limited in particular. The dielectric layer only needs to contain the SrO—TiO$_2$ based oxide or the ZnO—TiO$_2$ based oxide. In addition, it becomes possible to sinter at low temperature when producing the composite electronic device according to this invention. Specifically, it becomes possible to sinter at around 900° C. which is less than the melting point of Ag which can be used as the internal electrode material. Furthermore, the composite electronic device according to this invention is superior in reliability.

In the composite electronic device, it is preferable that the intermediate material layer contains Cu, a content of Cu contained in the intermediate material layer is 20.0 parts by weight or less in terms of CuO, and at least a part of Cu contained in the intermediate material layer is dissolved in the ZnO—TiO$_2$ compound.

In the composite electronic device, it is preferable that the intermediate material layer contains Mn, a content of Mn contained in the intermediate material layer is 3.0 parts by weight or less in terms of MnO, and at least a part of Mn contained in the intermediate material layer is dissolved in the ZnO—TiO$_2$ compound.

It is preferable that the magnetic layer contains a NiCuZn based ferrite or a CuZn based ferrite.

In the composite electronic device, it is preferable that the intermediate part includes a mixed layer, the mixed layer is located between the magnetic layer and the intermediate material layer, and the mixed layer is composed of a mixed material formed by mixing at least a part of the magnetic components contained in the magnetic layer and at least a part of the components contained in the intermediate material layer, In the composite electronic device, it is preferable that the coil conductor and the internal electrodes contain Ag as a conductive material.

In the composite electronic device, it is preferable that a thickness of the intermediate material layer is 5 to 75 μm.

DESCRIPTION OF THE PREFERRED EMBODIMENTS

In this embodiment, the laminated filter embodying the composite electronic device is exemplified, and the structure and the manufacturing method thereof are explained.

Laminated Filter

Figure 1:
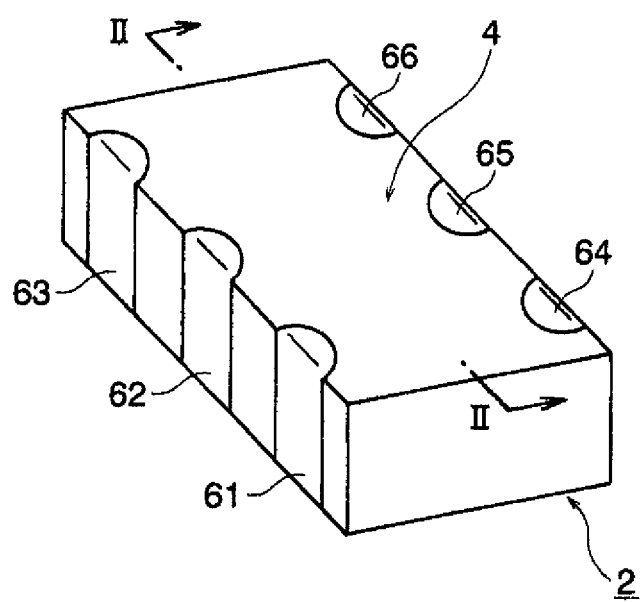
FIG. 1 is an external perspective view of a laminated filter according to an embodiment of the present invention.

As illustrated in FIG. 1, a laminated filter 2 according to an embodiment of the present invention is composed of a laminated three-terminal filter with a T-type lumped constant circuit constitution and has an element main body 4. External electrodes 61 to 66 are provided at both ends of the element main body 4.

An outer shape and dimensions of the element main body 4 are not particularly limited and can be set appropriately according to usage. Normally, the element main body 4 can be formed in a nearly rectangular parallelepiped outer shape and a dimension thereof can be set at approximately (0.4 to 5.6 mm)×(0.3 to 5.0 mm)×(0.2 to 1.9 mm).

Figure 2:
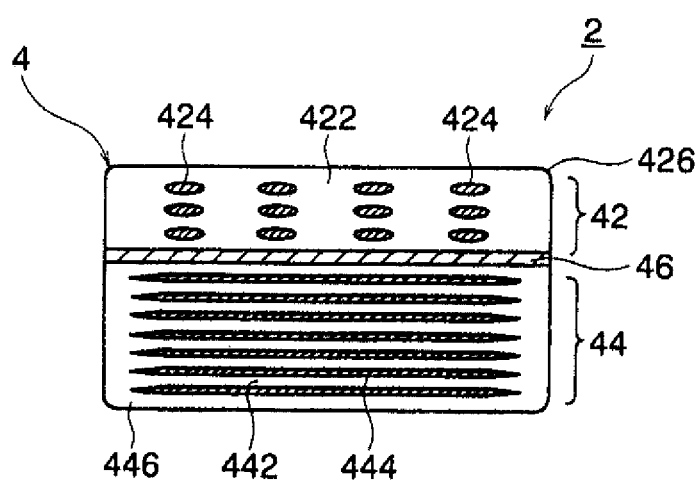
FIG. 2 is a cross sectional view along the II-II line of FIG. 1.

As illustrated in FIG. 2, in the element main body 4, a laminated chip inductor part 42 as a coil part and a laminated chip capacitor part 44 as a capacitor part are formed in the top and bottom, and an intermediate material layer 46 is interposed between the inductor part 42 and the capacitor part 44 to integrate them.

Laminated Chip Inductor Part

The laminated chip inductor part 42 includes a chip body 426 having a multi-layer structure in which a magnetic layer 422 and an internal electrode layer 424 are alternately laminated and integrated.

The magnetic layer 422 contains a magnetic ferrite composition. The kind of the magnetic ferrite composition is not particularly limited. For example, a NiCuZn based ferrite, a NiCuZnMg based ferrite, a CuZn based ferrite, a NiCu based ferrite, etc. are exemplified as the magnetic ferrite composition. In particular, it is preferable to use the NiCuZn based ferrite or the CuZn based ferrite.

In the following example, the NiCuZn based ferrite is used. The composition of the NiCuZn based ferrite is not particularly limited, and various compositions may be selected according to a purpose. It is preferable to use a ferrite composition which contains 30 to 50 mol % of $Fe_2O_3$, 0.1 to 50 mol % of NiO, 3 to 20 mol % of CuO, and 0.5 to 35 mol % of ZnO as main components in a ferrite sintered body after firing.

The ferrite composition may contain sub-components such as MnO, CoO, $SiO_2$, $SnO_2$, $Bi_2O_3$, $B_2O_3$, etc. other than the main components. The content of the sub-components may be set to about 0 to 5 moles (except 0 mole) with respect to 100 moles of the main components.

The internal electrode layer 424 whose each layer is nearly C-shape constitutes a closed magnetic path coil (winding pattern) by ensuring conduction spirally in the chip body 426, and the both ends thereof are connected to the external electrodes 61, 63, 64, 66. The internal electrode layer 424 is preferably formed using a conductive material mainly composed of Ag. The reason why it is preferable to use the conductive material mainly composed of Ag is that the resistance of Ag is small. The conductive material mainly composed of Ag may be Ag alloy, and Ag—Pd, Ag—Pt, Ag—Pd—Pt, etc. may be used as the Ag alloy. In addition, a Ti compound, a Zr compound, a Si compound, etc. may be added.

The thickness between electrodes and the base thickness of the magnetic layer 422 of the inductor part 42 are not particularly limited, and the thickness between electrodes (interval of the internal electrode layers 424, 424) can be set to 10 to 100 µm and the base thickness can be set to 100 to 500 µm. Furthermore, the thickness of the internal electrode layer 424 can be set in the range of 5 to 30 µm, and the pitch and the winding number of the winding pattern can be set 10 to 400 µm, 1.5 to 50.5 turn, respectively.

Laminated Chip Capacitor Part

The laminated chip capacitor part 44 includes a chip body 446 having a multi-layer structure in which a dielectric layer 442 and an internal electrode layer 444 are alternately laminated and integrated.

The dielectric layer 442 contains a dielectric ceramic composition. A SrO—$TiO_2$ based oxide or a ZnO—$TiO_2$ based oxide are used as the dielectric ceramic composition.

When using $SrTiO_3$ as a SrO—$TiO_2$ based oxide, it is preferable to further add boron, an oxide of Cu and/or an oxide of Mn. Boron is preferably added in a form of glass containing boron. This is because boron in a form of oxide is hard to handle since boric acid is easily precipitated due to time-dependent change.

It is preferable that the content of the glass containing boron is 2 to 5 wt %, the content of the oxide of Cu is 0 to 10 wt % in terms of CuO, and the content of the oxide of Mn is 0 to 1.5 wt % in terms of MnO, with respect to 100 wt % of $SrTiO_3$.

When using a ZnO—$TiO_2$ based oxide, it is preferable to use a ZnO—$TiO_2$ based oxide containing 40 to 90 mol % of $TiO_2$ and 10 to 60 mol % of ZnO. Further, when using a ZnO—$TiO_2$ based oxide, it is preferable to further add boron. Although the content of boron is not limited, boron is preferably added in the range of 0.1 to 6 wt % in terms of $B_2O_3$ with respect to 100 wt % of ZnO—$TiO_2$ based oxide. Boron is preferably added in a form of glass containing boron. This is because boron in a form of oxide is hard to handle since boric acid is easily precipitated due to time-dependent change.

The internal electrode layer 444 is formed using a conductive material mainly composed of Ag whose resistance is small, and each layer of the internal electrode layer 444 is alternatively connected to the external electrodes 62 and 65. The conductive material mainly composed of Ag may be Ag alloy, and Ag—Pd, Ag—Pt, Ag—Pd—Pt, etc. may be used as the Ag alloy. In addition, a Ti compound, a Zr compound, a Si compound, etc. may be added.

The thickness between electrodes and the base thickness of the dielectric layer 442 of the capacitor part 44 are not particularly limited. For example, the thickness between electrodes (interval of the internal electrode layers 444, 444) can be set to 1 to 50 µm and the base thickness can be set to 30 to 500 µm. Furthermore, the thickness of the internal electrode layer 444 can be set appropriately according to the thickness of the dielectric layer 442. Normally, the thickness of the internal electrode layer 444 can be set in the range of 1 to 20 µm.

Intermediate Material Layer

In this embodiment, the intermediate material layer 46 contains ZnO, $TiO_2$ and boron. Further, an intermediate part is composed only of the intermediate material layer 46. Hereinafter, the components other than ZnO, $TiO_2$, ZnO—$TiO_2$ compounds are referred to as sub-component in some cases.

The content of ZnO is set to 50 to 85 parts by mole and the content of $TiO_2$ is set to 15 to 50 parts by mole when the total of the content of ZnO and the content of $TiO_2$ contained in the intermediate material layer 46 is set to 100 parts by mole. The content of ZnO is set preferably to 55 to 80 parts by mole, and more preferably to 60 to 75 parts by mole.

When the content of ZnO is too low (when the content of $TiO_2$ is too high), an element diffusion progresses and a sinterability deteriorates at the time of co-sintering mentioned below. When the content of ZnO is too high (when the content of $TiO_2$ is too low), the production of ZnO—$TiO_2$ compound is reduced too much at the time of co-sintering mentioned below. In addition, an excess segregation of ZnO which causes a plating elongation occurs.

A method for adding boron to the intermediate material layer 46 and a form of the boron compound are not particularly limited. For example, boron may be contained as $B_2O_3$. Preferably, $B_2O_3$ is added in a form of glass containing $B_2O_3$ since $B_2O_3$ is easily soluble in water and hard to handle. By containing boron in the intermediate material layer 46, the laminated chip inductor part and the laminated chip capacitor part can be integrated without any defect. In addition, a sinterability is improved to make a low temperature sintering possible. For example, a sintering at around 900° C. which is less than the melting point of Ag becomes possible.

It is necessary that the intermediate material layer 46 contains boron. When the intermediate material layer 46 does not contain boron, it becomes hard to integrate the laminated chip inductor part and the laminated chip capacitor part without any defect because contraction of each layer accompanied by sintering does not coincide with each other at the time of co-sintering mentioned below since the intermediate material layer 46 can not obtain sufficient sinterability and the contraction is delayed.

It is preferable that the content of boron in the intermediate material layer 46 is 0.1 to 5.0 parts by weight. in terms of $B_2O_3$ when a total of the content of ZnO and the content of $TiO_2$ is set to 100 parts by weight. When $B_2O_3$ is contained beyond the above-mentioned range, it is likely that interlayer cracks increase due to brittleness of $B_2O_3$. By containing $B_2O_3$ in above-mentioned range, it becomes possible to effectively suppress the element diffusion without any defect.

Boron that is an essential component in sub-components in this embodiment may be a vitrified boron component. The effects of boron can be sufficiently obtained also by the vitrified boron component. As glasses containing boron as one of the components, $B_2O_3$—$SiO_2$ based, $B_2O_3$-MO based, $B_2O_3$—$SiO_2$-MO based, $B_2O_3$—$Bi_2O_3$—$SiO_2$ based, $B_2O_3$—$Bi_2O_3$—$SiO_2$-MO based (M is one or more selected from a group composed of Ca, Sr, Mg, Ba, or Zn), etc. are exemplified. In this embodiment, any of the above mentioned glasses can be used effectively.

In this embodiment, the intermediate material layer 46 contains a ZnO—$TiO_2$ compound generated from ZnO and $TiO_2$. Chemical reactions occur when ZnO and $TiO_2$ exist separately cause element diffusions of ZnO and $TiO_2$ resulting in insufficiency of sintering. However, when ZnO and $TiO_2$ constitute a ZnO—$TiO_2$ compound, ZnO and $TiO_2$ exist stably as a ZnO—$TiO_2$ compound and chemical reactions hardly occur. Therefore, element diffusions are suppressed. The content of the ZnO—$TiO_2$ compound contained in the intermediate material layer 46 is 50 wt % or more when a total weight of ZnO and $TiO_2$ contained in the intermediate material layer 46 is set to 100 wt %. When the content of the ZnO—$TiO_2$ compound contained in the intermediate material layer 46 is less than 50 wt %, the amount of ZnO and $TiO_2$ existing separately is increased. Thus, chemical reactions or element diffusions occur in ZnO and/or $TiO_2$, resulting in insufficiency of sintering. All amount of ZnO and $TiO_2$ may constitute the ZnO—$TiO_2$ compound.

The ZnO—$TiO_2$ compound indicates $ZnTiO_3$ phase, $Zn_2TiO_4$ phase, or $Zn_2Ti_3O_8$ phase. And, the generation of the $ZnTiO_3$ phase, the $Zn_2TiO_4$ phase, and the $Zn_2Ti_3O_8$ phase can be confirmed by methods such as X-ray diffraction measurement, STEM-EDS, EPMA measurement, etc.

In addition, the ZnO—$TiO_2$ compound includes compounds in which a part of Zn is replaced with Cu and/or Mn. The part of Zn is 30 parts by mole or less when a total content of Zn contained in the ZnO—$TiO_2$ compound is set to 100 parts by mole.

The timing of the generation of the ZnO—$TiO_2$ compound is not particularly limited. For example, the timing of calcining powder raw materials of the intermediate material layer is exemplified.

It is preferable that the intermediate material layer 46 contains CuO and/or MnO in addition to ZnO, $TiO_2$ and boron. By containing CuO and/or MnO, it becomes possible to promote the generation of the ZnO—$TiO_2$ compound and adjust sinterability of the intermediate material, etc.

It is preferable that the content of CuO is set to 20.0 parts by weight or less when a total of the content of ZnO and the content of $TiO_2$ is set to 100 parts by weight. Further, it is preferable that the content of MnO is set to 3.0 parts by weight or less. In addition, it is preferable that CuO and/or MnO are dissolved in the ZnO—$TiO_2$ compound. When CuO and/or MnO are dissolved in the ZnO—$TiO_2$ compound, the element diffusion at the time of co-sintering is effectively suppressed since the generation of the ZnO—$TiO_2$ compound is accelerated and a ratio of the ZnO—$TiO_2$ compound is increased.

Though the thickness of the intermediate material layer 46 is not particularly limited, it is preferably 5 to 75 μm and more preferably 10 to 50 μm.

External Electrodes

A material of the external electrodes 61 to 66 is not particularly limited. For example, electroplated Ag electrodes can be used. It is preferable that the electroplating is performed using Cu—Ni—Sn, Ni—Sn, Ni—Au, Ni—Ag, etc.

Method for Manufacturing Laminated Filter

An example of a method for manufacturing the laminated filter 2 is described. The laminated filter 2 in this embodiment is manufactured by preparing a dielectric green sheet, a magnetic green sheet and an intermediate material green sheet, laminating these green sheets to form an pre-firing element body in a green state, firing this, and then forming the external electrodes. Hereinafter, the manufacturing method is specifically described.

Fabrication of Dielectric Green Sheet and Formation of Internal Electrodes

First, each raw material which constitutes the dielectric raw material is prepared and formed into a coating material to prepare a paste for dielectric layer.

The paste for dielectric layer may be an organic coating material obtained by kneading the dielectric raw material with an organic vehicle or an aqueous coating material. As the dielectric raw material, $SrTiO_3$ may be used, and various kinds of compounds to be $SrTiO_3$ after firing such as an oxide of Sr and/or Ti, a carbonate, an oxalate, a nitrate, a hydroxide, and an organometallic compound may be selected appropriately and mixed to be used. In addition, an oxide of Cu or a glass (e.g., borosilicate glass), etc. may be contained as necessary. Incidentally, the dielectric raw material may be previously reacted by pre-firing (temporary firing) each starting raw material which constitutes the dielectric raw material before formed into the paste for dielectric layer.

A paste for internal electrode layer is prepared by kneading a conductive material such as Ag with the organic vehicle described above.

The content of the organic vehicle in each pastes described above is not particularly limited, and it may be a usual content, for example, the binder is about from 5 to 15 parts by weight and the solvent is about from 50 to 150 parts by weight with respect to 100 parts by weight of pre-firing powder. In addition, additives selected from inorganic substances and organic substances such as various kinds of dispersant and plasticizers may be contained in each paste if necessary. The total content thereof is preferably 10 parts by weight or less.

Then, the paste for dielectric layer is formed into a sheet shape by a doctor-blade method, etc. to obtain the dielectric green sheet.

Then, the internal electrodes are formed on the dielectric green sheet. The internal electrodes are formed on the dielectric green sheet by arranging the paste for internal electrode layer on the dielectric green sheet by screen printing method, etc. Incidentally, a pattern of the internal electrodes may be selected appropriately depending on a circuit configuration, etc. of the laminated filter to be manufactured.

Fabrication of Magnetic Green Sheet and Formation of Coil Conductor

First, each raw material which constitutes the magnetic raw material is prepared and formed into a coating material to prepare a paste for magnetic layer.

The paste for magnetic layer may be an organic coating material obtained by kneading the magnetic raw material with an organic vehicle or an aqueous coating material. As the magnetic raw material, oxides of Ni, Cu, Zn, and Fe, etc. may be used as starting raw material of main component, and various kinds of compounds to be oxides mentioned above after firing such as a carbonate, an oxalate, a nitrate, a hydroxide, and an organometallic compound may be selected appropriately and mixed to be used. Further, a starting raw material of sub-component may be contained in addition to the main component as necessary. Incidentally, the magnetic raw material may be previously reacted by pre-firing (temporary firing) each starting raw material which constitutes the magnetic raw material before formed into the paste for magnetic layer.

A paste for coil conductor is prepared by kneading a conductive material such as Ag with the organic vehicle described above.

Then, the paste for magnetic layer is formed into a sheet shape by a doctor-blade method, etc. to obtain the magnetic green sheet.

Then, the coil conductor is formed on the magnetic green sheet. The coil conductor is formed on the magnetic green sheet by arranging the paste for coil conductor on the magnetic green sheet by screen printing method, etc. Incidentally, a pattern of the coil conductor may be selected appropriately depending on a circuit configuration, etc. of the laminated filter to be manufactured.

Fabrication of Intermediate Material Green Sheet

First, a raw material for intermediate material which constitutes the intermediate material is prepared. As the raw material for intermediate material, a ZnO powder, a $TiO_2$ powder, a glass containing $B_2O_3$ are exemplified. Further, a CuO powder and/or a MnO powder may be used. In addition, compounds to be oxides of Zn, Ti, Cu, Mn and B after firing may be used.

Then, the powders of raw material other than the glass containing $B_2O_3$ among the above mentioned raw materials for intermediate material are mixed to obtain a mixed powder.

Then, the mixed powder is calcined in air after being dried to obtain a calcined powder. By calcining the mixed powder, the $ZnO-TiO_2$ compound can be generated. The generation of the $ZnO-TiO_2$ compound by calcining can be confirmed by conducting X-ray diffraction measurement on the calcined powder and observing peaks of one or more selected from a group composed of $ZnTiO_3$, $Zn_2TiO_4$ and $Zn_2Ti_3O_8$.

The calcining temperature and the calcining time are not particularly limited. The calcining temperature can be appropriately selected in the range from 500 to 1100° C., preferably from 600 to 1000° C., and more preferably from 800 to 950° C. By setting the calcining temperature to more than 500° C., it becomes easy to progress the chemical reaction and sufficiently generate the $ZnO-TiO_2$ compound. Further, by setting the calcining temperature to 1100° C. or less, it becomes possible to suppress a particulate growth of necking and facilitate a subsequent pulverizing process. In addition, the calcining time can be appropriately selected in the range from 0.5 to 10 hours and preferably from 2 to 3 hours. The higher the calcining temperature is or the longer the calcining time is, the more likely the production of the $ZnO-TiO_2$ compound to increase.

Subsequently, the glass containing $B_2O_3$ is added to the calcined powder and pulverized by a ball mill to obtain a pulverized powder. Then, the organic vehicle is added to the pulverized powder and formed into a slurry to obtain a paste for intermediate material layer.

The content of the organic vehicle in the paste for intermediate material layer is not particularly limited, and it may be a usual content, for example, the binder is about from 5 to 15 parts by weight and the solvent is about from 50 to 150 parts by weight with respect to 100 parts by weight of the pulverized powder. In addition, additives selected from inorganic substances and organic substances such as various kinds of dispersant and plasticizers may be contained in the paste for intermediate material layer if necessary. The total content thereof is preferably 10 parts by weight or less with respect to 100 parts by weight of the pulverized powder.

Then, the paste for intermediate material layer is formed into a sheet shape by a doctor-blade method, etc. to obtain the intermediate material green sheet.

Lamination of Each Green Sheet

Next, at least one dielectric green sheet, at least one magnetic green sheet and at least one intermediate material green sheet are laminated to form the pre-firing element body in a green state.

In this embodiment, the pre-firing element body in a green state is manufactured by laminating a plurality of magnetic green sheets in which the coil conductor which constitutes the coil part is formed and then laminating a plurality of dielectric green sheets in which the internal electrodes which constitute the capacitor part is formed on the laminate of magnetic green sheets while interposing the intermediate material green sheet between them.

Incidentally, the magnetic green sheet in which the coil conductor is not formed may be laminated to the bottom layer of the coil part, and the dielectric green sheet in which the internal electrodes are not formed may be laminated on the top layer of the coil part.

Firing and Formation of External Electrodes

Next, the pre-firing element body in a green state is fired to form the element main body 4 as a sintered body (see FIG. 1 and FIG. 2).

Though the conditions for firing are not particularly limited, temperature increasing speed is set preferably to from 50 to 500° C./hour and more preferably to from 200 to 300° C./hour, retention temperature is set preferably to from 840 to 900° C., temperature retention time is set preferably to from 0.5 to 8 hours and more preferably to from 1 to 3 hours, cooling speed is set preferably to from 50 to 500° C./hour and more preferably to from 200 to 300° C./hour.

Subsequently, end surface polishing is performed on the element main body (sintered body) 4 by barrel polishing or sandblast, etc., and the paste for external electrodes are coated, dried and then baked on the both end surfaces of the element main body 4 to form the external electrodes 61 to 66 shown in FIG. 1. Further, an electroplating is performed on the external electrodes. It is preferable that the electroplating is performed using Cu—Ni—Sn, Ni—Sn, Ni—Au, Ni—Ag, etc.

The laminated filter 2 manufactured in this way is implemented on a printed board by soldering, etc. and used for various electronic apparatuses. Further, it is favorable that the laminated filter 2 does not contain Pb from the viewpoint of environmental consideration.

Other Embodiment

The embodiment of the present invention was described hereinabove, it is obvious that the present invention is not limited at all to the embodiment set forth herein and various modifications are possible without departing from the scope of the invention In the above-mentioned embodiment, the intermediate part is composed only of the intermediate material layer 46. However, the intermediate part may include layers other than the intermediate material layer. For example, the intermediate part may include a mixed layer.

The mixed layer is characterized by being composed of a mixed material formed by mixing at least a part of the magnetic components contained in the magnetic layer and at least a part of the components contained in the intermediate material layer. In addition, the mixed layer may be composed of the mixed material formed by mixing all of the magnetic components contained in the magnetic layer and all of the intermediate materials contained in the intermediate material layer.

When the mixed layer is disposed between the magnetic layer and the intermediate material layer, the magnetic components and the intermediate material are integrated more easily than when the mixed layer is not disposed.

Although a ratio of the part of the magnetic components contained in the mixed material to the components contained in the intermediate material layer is not particularly limited, it is preferably 5:5 to 3:7 in weight ratio. Further, when the mixed layer is used, a ratio of the thickness of the mixed layer (t2) to the thickness of the intermediate material layer (t1) can be freely set, and it is preferably set to t2/t1≥1.

Though the laminated filter was exemplified as the composite electronic device of the present invention in the embodiment, the composite electronic device is not limited to a laminated filter and may be any other device as long as it has the above constitution.

In addition, a form of the laminated filter is not particularly limited. For example, T-type circuit, π-type circuit, L-type circuit, double π-type circuit formed by two π-type circuits, and array type formed by any two or more of the above-mentioned circuits are exemplified. Further, a varistor part for effecting varistor function may be additionally included.

The composite electronic device according to the present invention is mounted in various electronic apparatuses such as information apparatuses (e.g., PC or mobile phone) and video apparatuses (e.g., TV or video camera) for use.

EXAMPLES

Hereinafter, the present invention will be explained with reference to further detailed Examples, but the present invention is not limited to these Examples.

Experiment Example 1

Fabrication of Dielectric Green Sheet

First, $SrTiO_3$, borosilicate glass and CuO were prepared as each raw material which constitutes a dielectric raw material. Each raw material was compounded and pulverized to prepare a dielectric raw material powder. With regard to the compounded amount of each compound, the borosilicate glass was set to 4 parts by weight and CuO was set to 1 part by weight with respect to 100 parts by weight of $SrTiO_3$. A resin binder, a solvent, plasticizers and a dispersant were added to the obtained dielectric raw material powder, and then the dielectric green sheet containing an $SrO$—$TiO_2$ based oxide was fabricated by a doctor-blade method. The thickness of the dielectric green sheet was set so as to be 18 μm after firing.

Then, internal electrodes were formed on the dielectric green sheet by using a paste for internal electrodes composed mainly of Ag to fabricate the dielectric green sheet having a desired electrode pattern. The thickness of the electrode pattern was set so as to be 3 μm after firing.

Fabrication of Magnetic Green Sheet

First, NiO, CuO, ZnO and $Fe_2O_3$ were prepared as raw materials which constitute a magnetic raw material. These raw materials were compounded, temporarily fired and pulverized to prepare a magnetic raw material powder. With regard to the compounded ratio of each compound, NiO was set to 25 parts by mole, CuO was set to 11 parts by mole, ZnO was set to 15 parts by mole, and $Fe_2O_3$ was set to 49 parts by mole. A resin binder, a solvent, plasticizers and a dispersant were added to the obtained magnetic raw material powder, and then the magnetic green sheet containing NiCuZn based oxide was fabricated by a doctor-blade method. The thickness of the magnetic green sheet was set so as to be about 20 μm after firing.

Then, a coil conductor pattern was formed on the magnetic green sheet using a paste for coil conductor composed mainly of Ag by screen printing and through holes were formed by laser processing to fabricate the magnetic green sheet having a desired conductor pattern and through holes. The thickness of the coil conductor pattern was set so as to be 12 μm after firing.

Fabrication of Intermediate Material Green Sheet

First, ZnO, $TiO_2$, CuO and MnO were prepared as raw materials of an intermediate material. These raw materials were compounded to prepare a mixed powder. Incidentally, an average particle diameter of each raw material powder was properly changed in accordance with a target generation amount of $ZnO$—$TiO_2$ compound.

Then, the mixed powder was calcined in air after being dried to obtain a calcined material. The calcining temperature and the calcining time were appropriately selected as shown in Table 1 in accordance with a target content of $ZnO$—$TiO_2$ compound. Subsequently, the glass containing $B_2O_3$ was added to the calcined material and pulverized by a ball mill to obtain a pulverized powder. The content of $B_2O_3$ in the glass containing $B_2O_3$ was set to 50 parts by weight with respect to 100 parts by weight of the glass containing $B_2O_3$.

The compounded ratio of the glass containing $B_2O_3$, ZnO, $TiO_2$, CuO and MnO was set to the compounded ratio shown in Table 1.

Then, a resin binder, a solvent, plasticizers and a dispersant were added to the obtained pulverized powder, and then the intermediate material green sheet was fabricated by a doctor-blade method. The thickness of the intermediate material green sheet was set so as to be about 15 μm after firing.

Lamination of Each Green Sheet, Firing and Formation of External Electrodes

Next, a plurality of the obtained dielectric green sheets and magnetic green sheets were laminated with the intermediate material green sheet interposed therebetween to form a multi-piece laminated three-terminal filter in a green state. The multi-piece laminated three-terminal filter in a green state was cut into units so as to be 1608 size (length: 1.6 mm, width: 0.8 mm, height: 0.6 mm) after firing. Then, co-sintering was performed by firing at 880° C. to fabricate a co-sintered element main body 4 (see FIGS. 1, 2). Incidentally, the firing time was appropriately selected in accordance with target generation amount of $ZnO$—$TiO_2$ compound.

Then, the paste for external electrode is coated, dried and then baked on the both end surfaces of the co-sintered element main body 4 to fabricate the laminated filter sample shown in FIG. 1.

Subsequently, the generation amount of $ZnO$—$TiO_2$ compound, presence/absence of a defect in the co-sintered element main body 4, and a reliability defect rate were measured relative to the obtained laminated filter sample.

The generation amount of $ZnO$—$TiO_2$ compound was obtained by semi quantity determination method based on peak intensity in an X-ray diffraction pattern measured and obtained by using an X-ray diffraction device (X'Pert PRO MPD CuKa-ray made by PANalytical). As the result of evaluating Sample No. 4 presented in Table 1 by using this method, a generation of $Zn_2TiO_4$ which is a kind of $ZnO$—$TiO_2$ compound was confirmed.

The presence/absence of a defect in the co-sintered element main body 4 was judged by observing the co-sintered element main body 4 with an electron microscope.

The reliability defect rate was measured by performing a pressure cooker bias test (PCBT test) on one hundred laminated filter samples. The PCBT test in this experiment example was performed by leaving one hundred laminated filter samples under an environment at an applied voltage of 10V, 2 atm, a humidity of 85% and a temperature of 125° C. for 48 hours. The laminated filter samples whose insulation resistance was lowered to $1 \times 10^6$ or less after the PCBT test ware judged to be defective. A ratio of defective laminated filter samples to a total laminated filter samples was defined as the reliability defect rate. The reliability defect rate was obtained by calculation. The reliability was evaluated to be favorable when the reliability defect rate was 10% or less.

Note that, it was judged that there was no point in performing the measurement of the reliability defect rate on the sample in which a defect occurred after co-sintering and the measurement of the reliability defect rate was omitted.

TABLE 1

| | | | | | | | | | | | Test result | |
|---|---|---|---|---|---|---|---|---|---|---|---|---|
| | | | | | | | | | | | | % |
| | | | | | | | | | | | Generation | Defect |
| | | | | | | wt % | | | ° C. | h | amount of | after | % Reliability |
| Sample No. | Magnetic layer | Dielectric layer | pts.mol ZnO | pts.mol $TiO_2$ | pts.wt $B_2O_3$ | pts.wt CuO | pts.wt MnO | Calcining temperature | Calcining time | $ZnO$—$TiO_2$ compound | co-sintering | defect rate |
| *1 | NCZ | ST | 40.0 | 60.0 | 1.0 | 0.0 | 0.0 | 950 | 2 | 70 | Yes | 97 |
| 2 | NCZ | ST | 50.0 | 50.0 | 1.0 | 0.0 | 0.0 | 950 | 2 | 85 | No | 3 |
| 3 | NCZ | ST | 66.7 | 33.3 | 1.0 | 0.0 | 0.0 | 950 | 2 | 94 | No | 0 |
| 4 | NCZ | ST | 70.0 | 30.0 | 1.0 | 0.0 | 0.0 | 950 | 2 | 86 | No | 0 |
| 5 | NCZ | ST | 85.0 | 15.0 | 1.0 | 0.0 | 0.0 | 950 | 2 | 50 | No | 9 |
| *6 | NCZ | ST | 90.0 | 10.0 | 1.0 | 0.0 | 0.0 | 950 | 2 | 30 | Yes | — |
| *7 | NCZ | ST | 50.0 | 50.0 | 1.0 | 0.0 | 0.0 | 500 | 2 | 19 | Yes | — |
| 8 | NCZ | ST | 70.0 | 30.0 | 1.0 | 0.0 | 0.0 | 500 | 2 | 25 | Yes | — |
| 9 | NCZ | ST | 70.0 | 30.0 | 1.0 | 0.1 | 0.0 | 850 | 3 | 87 | No | 0 |
| 10 | NCZ | ST | 70.0 | 30.0 | 1.0 | 5.0 | 0.0 | 850 | 2 | 89 | No | 0 |
| 11 | NCZ | ST | 70.0 | 30.0 | 1.0 | 20.0 | 0.0 | 850 | 2 | 91 | No | 0 |
| *12 | NCZ | ST | 70.0 | 30.0 | 0.0 | 0.0 | 0.0 | 800 | 3 | 78 | Yes | — |
| 13 | NCZ | ST | 70.0 | 30.0 | 0.1 | 0.0 | 0.0 | 800 | 3 | 78 | No | 4 |
| 14 | NCZ | ST | 70.0 | 30.0 | 5.0 | 0.0 | 0.0 | 800 | 2 | 76 | No | 9 |
| 15 | NCZ | ST | 70.0 | 30.0 | 1.0 | 1.0 | 3.0 | 850 | 2 | 90 | No | 0 |
| 16 | CZ | ST | 70.0 | 30.0 | 1.0 | 0.0 | 0.0 | 950 | 2 | 86 | No | 0 |
| 17 | NCZ | ZT | 70.0 | 30.0 | 1.0 | 0.0 | 0.0 | 950 | 2 | 86 | No | 0 |
| 18 | CZ | ZT | 70.0 | 30.0 | 1.0 | 0.0 | 0.0 | 950 | 2 | 86 | No | 0 |

*represents Comparative Example

Sample Nos. 2, 7 in Table 1 were samples in which the generation amount of $ZnO$—$TiO_2$ compound was changed by changing calcining conditions and firing conditions. Sample Nos. 4, 8 in Table 1 were samples in which the generation amount of $ZnO$—$TiO_2$ compound was changed by changing calcining conditions and firing conditions. Further, all the samples other than Sample Nos. 7, 8 in Table 1 were fabricated under the same calcining conditions and firing conditions to confirm a change of the generation amount of $ZnO$—$TiO_2$ compound accompanied by a composition change. Incidentally, NCZ in Table 1 indicates NiCuZn based ferrite. CZ indicates CuZn based ferrite. ST indicates $SrO$—$TiO_2$ based oxide. ZT indicates $ZnO$—$TiO_2$ based oxide.

As shown in Table 1, no defects after co-sintering occurred and favorable reliability results were obtained when all of the contents of ZnO, $TiO_2$ and $B_2O_3$ and the generation amount of $ZnO$—$TiO_2$ compound were within the range of the invention (Sample Nos. 2 to 5, 9 to 11, 13 to 15).

When the content of ZnO is too low (Sample No. 1), an element diffusion progressed and a sinterability deteriorated at the time of co-sintering because a residual $TiO_2$ became likely to react chemically with the magnetic layer and the dielectric layer even though a predetermined amount of $ZnO$—$TiO_2$ compound was generated. And, the reliability result was not favorable.

When the content of ZnO is too large (Sample No. 6), generation amount of $ZnO$—$TiO_2$ compound became insufficient. Further, ZnO excessively segregated on the surface of the laminated filter after co-sintering. A plating elongation occurred in the site where ZnO excessively segregated. It was judged that there was no point in conducting the reliability evaluation because a withstand voltage between terminal electrodes was lowered due to the plating elongation.

When the generation amount of ZnO—TiO$_2$ compound is too small (Sample Nos. 7, 8) even though the contents of ZnO and TiO$_2$ are within a predetermined range, the element diffusion progressed and the sinterability deteriorated at the time of co-sintering. The calcining temperature was low in Sample Nos. 7, 8, Thus, the generation amount of ZnO—TiO$_2$ compound decreased and ZnO and TiO$_2$ which separately exist increased because the chemical reaction was not sufficiently progressed. Further, ZnO and/or TiO$_2$ chemically reacted with the components of the magnetic layer and the dielectric layer. Mainly, ZnO reacted with the magnetic layer, and TiO$_2$ reacted with the dielectric layer. As a result of observation of Sample Nos. 7, 8 by electron microscope, it was judged that there was no point in conducting the reliability evaluation because the sinterability of the dielectric layer was too lowered.

When B$_2$O$_3$ was not contained (Sample No. 12), the intermediate material layer could not obtain sufficient sinterability and a contraction of the intermediate material layer was delayed, even though a predetermined amount of ZnO—TiO$_2$ compound was generated. Thus, each layer could not be integrated because the contraction of each layer accompanied by sintering did not coincide with each other and peelings accompanied by the uncoincidence of contraction occurred.

In addition, when all of the contents of ZnO, TiO$_2$ and B$_2$O$_3$ and the generation amount of ZnO—TiO$_2$ compound were within the range of the invention, favorable results were obtained even if CuO and/or MnO was contained as sub-component (Sample Nos. 9 to 11, 15). The results of Sample Nos. 4, 9 to 11, 15 show that the generation of the ZnO—TiO$_2$ compound was promoted by containing CuO and/or MnO. Incidentally, the results of STEM-EDX measurement show that CuO and/or MnO were dissolved in the ZnO—TiO$_2$ compound in these samples.

Figure 3A:
FIG. 3A is an electron micrograph indicating the sintered state in the vicinity of the interface between the magnetic layer and the intermediate material layer of Sample No. 4 in Experiment example 1.
Figure 3B:
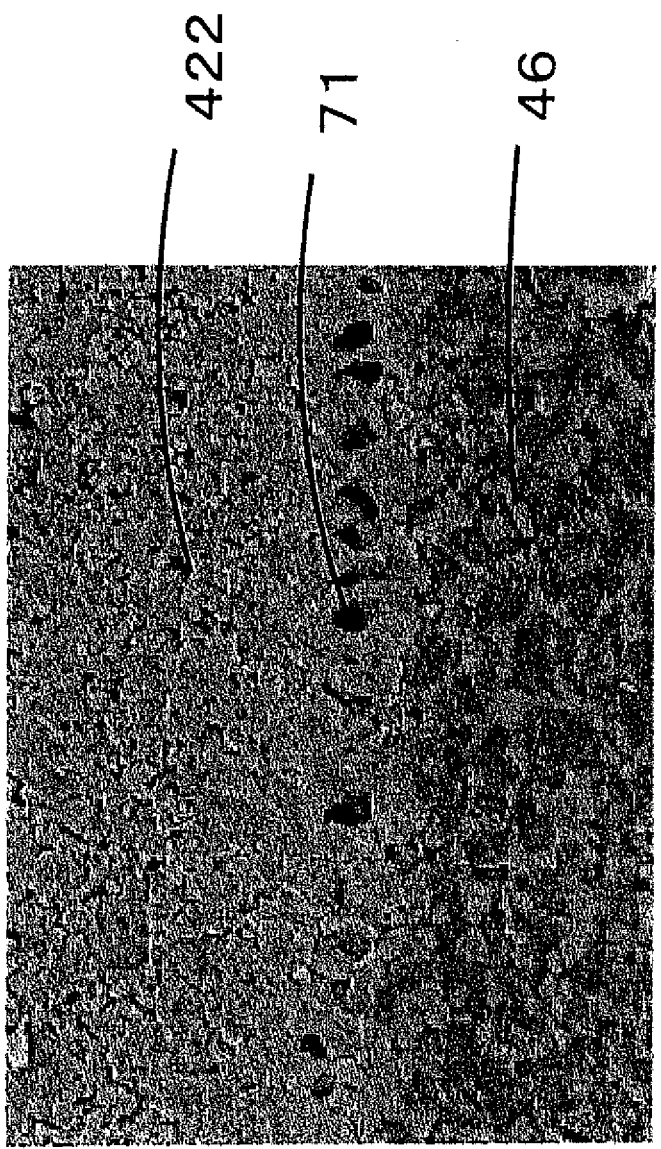
FIG. 3B is an electron micrograph indicating the sintered state in the vicinity of the interface between the magnetic layer and the intermediate material layer of Sample No. 1 in Experiment example 1.
Figure 4A:
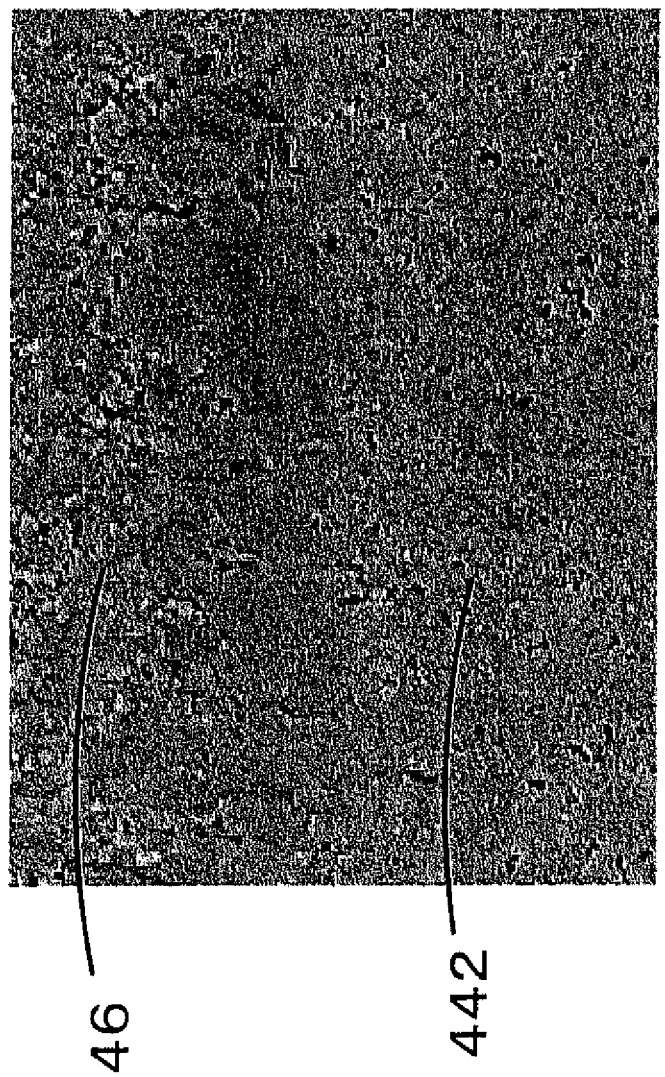
FIG. 4A is an electron micrograph indicating the sintered state in the vicinity of the interface between the intermediate material layer and the dielectric layer of Sample No. 4 in Experiment example 1.
Figure 4B:
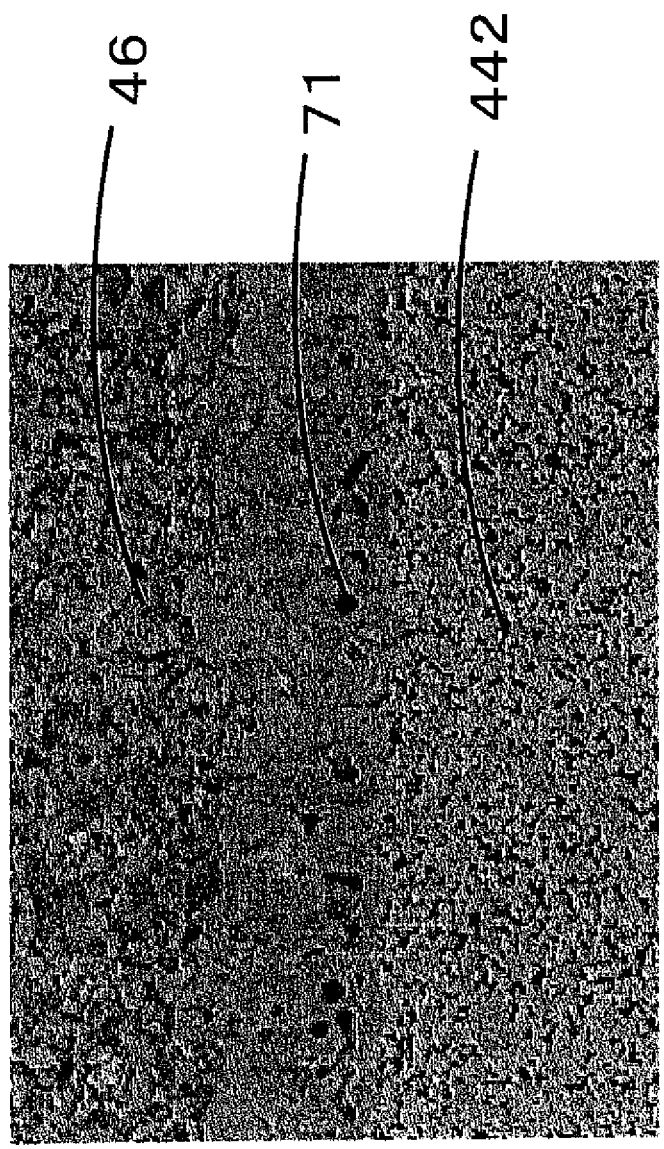
FIG. 4B is an electron micrograph indicating the sintered state in the vicinity of the interface between the intermediate material layer and the dielectric layer of Sample No. 1 in Experiment example 1.
Figure 5A:
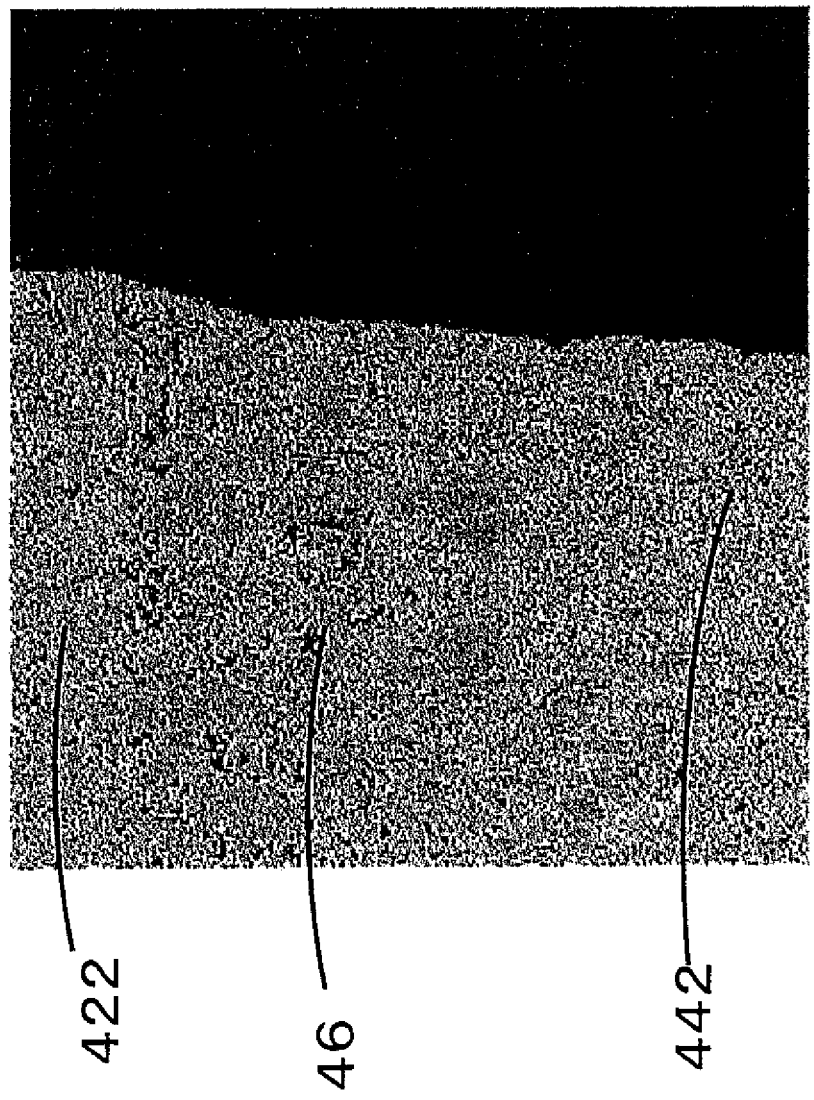
FIG. 5A is an electron micrograph indicating the joined state in the vicinity of the intermediate material layer of Sample No. 4 in Experiment example 1.
Figure 5B:
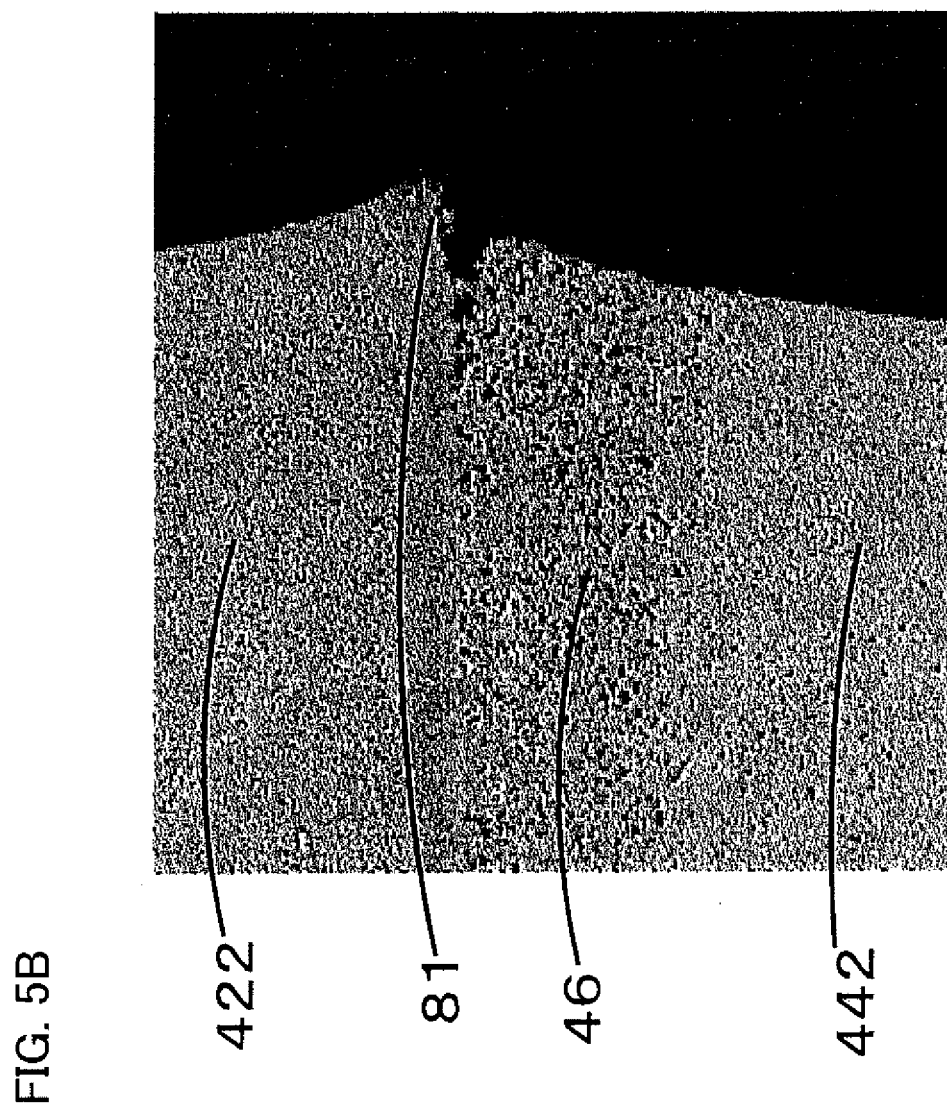
FIG. 5B is an electron micrograph indicating the joined state in the vicinity of the intermediate material layer of Sample No. 12 in Experiment example 1.

Here, photographs of the vicinity of the intermediate material layer were taken by electron microscope for Sample No. 4 (example), Sample No. 1 (comparative example) and Sample No. 12 (comparative example). FIG. 3A shows the result of photographing of the vicinity of the interface between the magnetic layer and the intermediate material layer for Sample No. 4. FIG. 4A shows the result of photographing of the vicinity of the interface between the intermediate material layer and the dielectric layer for Sample No. 4. FIG. 5A shows the result of photographing of the vicinity of the intermediate material layer for Sample No. 4. FIG. 3B shows the result of photographing of the vicinity of the interface between the magnetic layer and the intermediate material layer for Sample No. 1. FIG. 4B shows the result of photographing of the vicinity of the interface between the intermediate material layer and the dielectric layer for Sample No. 1. FIG. 5B shows the result of photographing of the vicinity of the intermediate material layer for Sample No. 12.

From FIGS. 3A, 3B, 4A, 4B, an occurrence of a large number of voids 71 in the vicinity of the interface between the intermediate material layer 46 and the dielectric layer 442 and the vicinity of the interface between the intermediate material layer 46 and the magnetic layer 422 was confirmed in Sample No. 1 (comparative example), unlike Sample No. 4 (example). Further, a lowering of sinterability of the dielectric layer 442 was confirmed in Sample No. 1. In addition, from FIGS. 5A, 5B, an occurrence of peelings 81 in the interface between the intermediate material layer 46 and the magnetic layer 422 was confirmed in Sample No. 12 (comparative example), unlike Sample No. 4 (example).

Experiment Example 2

The laminated filter sample (Sample No. 16) was fabricated in the same manner as Sample No. 4 in Experiment example 1, except that a material of the magnetic layer was changed from NiCuZn based ferrite to CuZn based ferrite. With regard to the compounded ratio of each compound in CuZn based ferrite, CuO was set to 8 parts by mole, ZnO was set to 43 parts by mole, Fe$_2$O$_3$ was set to 49 parts by mole. The test results are presented in Table 1.

In Sample No. 16, the excellent results were obtained as with Sample No. 4.

Experiment Example 3

The laminated filter sample (Sample No. 17) was fabricated in the same manner as Sample No. 4 in Experiment example 1, except that a material of the dielectric layer was changed from SrO—TiO$_2$ based oxide to ZnO—TiO$_2$ based oxide. With regard to the compounded amount of each compound in ZnO—TiO$_2$ based oxide, 30 mol % of ZnO and 70 mol % of TiO$_2$ were compounded as a main component raw material and 0.5 part by weight of B$_2$O$_3$ was added with respect to 100 parts by weight of the main component raw material. The test results are presented in Table 1.

In Sample No. 17, the excellent results were obtained as with Sample No. 4.

Experiment Example 4

The laminated filter sample (Sample No. 18) was fabricated in the same manner as Sample No. 17 in Experiment example 3, except that a material of the magnetic layer was changed from NiCuZn based ferrite to CuZn based ferrite. With regard to the compounded ratio of each compound in CuZn based ferrite, CuO was set to 8 parts by mole, ZnO was set to 43 parts by mole, Fe$_2$O$_3$ was set to 49 parts by mole. The test results are presented in Table 1.

In Sample No. 18, the excellent results were obtained as with Sample No. 17.

Experiment Example 5

The laminated filter sample was fabricated in the same manner as the samples in Experiment example 1, except that the magnetic green sheets and the intermediate material green sheet were laminated with mixed material green sheets formed by mixing a material of the magnetic layer and a material of the intermediate material layer interposed therebetween. Incidentally, a weight ratio of the material of the magnetic layer to the material of the intermediate material layer in the mixed material green sheet was set to 5:5. And, the thickness of the mixed material green sheet was set to 20 μm.

In Experiment example 5, the results similar to those in Experiment example 1 were obtained.

As mentioned above, the magnetic layer and the dielectric layer could be integrated without any defect by setting the composition of the intermediate material layer containing ZnO—TiO$_2$ compound within the range of the invention, even though the magnetic layer was composed of CuZn based ferrite and the dielectric layer was composed of ZnO—TiO$_2$ based oxide. In addition, the magnetic layer and the dielectric layer could be integrated without any defect by setting the composition of the intermediate material layer containing ZnO—TiO$_2$ compound within the range of the invention, even when the mixed layer was further interposed between the magnetic layer and the intermediate material layer.

REFERENCE SIGNS LIST

2 Laminated filter
4 Element main body
42 Laminated chip inductor part (coil part)
422 Magnetic layer
424 Internal electrode layer
426 Chip body
44 Laminated chip capacitor part (capacitor part)
442 Dielectric layer
444 Internal electrode layer
446 Chip body
46 Intermediate material layer
61-66 External electrodes
71 Voids
81 Peelings

The invention claimed is:

1. A composite electronic device comprising a coil part, a capacitor part and an intermediate part, wherein
   the coil part includes a coil conductor and a magnetic layer,
   the capacitor part includes internal electrodes and a dielectric layer,
   the dielectric layer contains a SrO—TiO$_2$ based oxide,
   the intermediate part is located between the coil part and the capacitor part,
   the intermediate part includes an intermediate material layer,
   the intermediate material layer contains ZnO, TiO$_2$, boron and Cu,
   a content of ZnO contained in the intermediate material layer is 50 to 85 parts by mole and a content of TiO$_2$ contained in the intermediate material layer is 15 to 50 parts by mole when a total of the content of ZnO and the content of TiO$_2$ contained in the intermediate material layer is set to 100 parts by mole,
   a content of boron contained in the intermediate material layer is 0.1 to 5.0 parts by weight in terms of B$_2$O$_3$ when a total of the content of ZnO and the content of TiO$_2$ contained in the intermediate material layer is set to 100 parts by weight,
   a content of Cu contained in the intermediate material layer is 20.0 parts by weight or less in terms of CuO,
   a part of ZnO and TiO$_2$ contained in the intermediate material layer constitute a ZnO—TiO$_2$ compound,
   at least a part of Cu contained in the intermediate material layer is dissolved in the ZnO—TiO$_2$ compound, and
   a content of the ZnO—TiO$_2$ compound contained in the intermediate material layer is 50 wt % or more when a total weight of ZnO and TiO$_2$ contained in the intermediate material layer is set to 100 wt %.

2. The composite electronic device according to claim 1, wherein
   the intermediate material layer contains Mn,
   a content of Mn contained in the intermediate material layer is 3.0 parts by weight or less in terms of MnO, and
   at least a part of Mn contained in the intermediate material layer is dissolved in the ZnO—TiO$_2$ compound.

3. The composite electronic device according to claim 1, wherein
   the magnetic layer contains a NiCuZn based ferrite or a CuZn based ferrite.

4. The composite electronic device according to claim 1, wherein
   the intermediate part includes a mixed layer,
   the mixed layer is located between the magnetic layer and the intermediate material layer, and
   the mixed layer is composed of a mixed material formed by mixing at least a part of the magnetic components contained in the magnetic layer and at least a part of the components contained in the intermediate material layer.

5. The composite electronic device according to claim 1, wherein
   the coil conductor and the internal electrodes contain Ag as a conductive material.

6. The composite electronic device according to claim 1, wherein
   a thickness of the intermediate material layer is 5 to 75 μm.

7. The composite electronic device according to claim 1, wherein
   a content of ZnO contained in the intermediate material layer is 55 to 80 parts by mole when a total of the content of ZnO and the content of TiO$_2$ contained in the intermediate material layer is set to 100 parts by mole.

8. The composite electronic device according to claim 1, wherein
   a content of ZnO contained in the intermediate material layer is 60 to 75 parts by mole when a total of the content of ZnO and the content of TiO$_2$ contained in the intermediate material layer is set to 100 parts by mole.

9. The composite electronic device according to claim 1, wherein
   the boron contained in the intermediate material layer is present as a vitreous boron component.

10. The composite electronic device according to claim 1, wherein
    a thickness of the intermediate material layer is 10 to 50 μm.

* * * * *